United States Patent [19]
Rattunde

[11] 3,782,213
[45] Jan. 1, 1974

[54] INFINITELY VARIABLE CONE PULLEY TRANSMISSION

[75] Inventor: Manfred Rattunde, Bad Homburg v.d.H., Germany

[73] Assignee: Werner Reimers Kommanditgesellschaft, Bad Homburg, Germany

[22] Filed: June 16, 1972

[21] Appl. No.: 263,599

[52] U.S. Cl. ........................ 74/230.17 F
[51] Int. Cl. ............................. F16h 55/22
[58] Field of Search ............ 74/230.17 F, 230.17 A

[56] References Cited
UNITED STATES PATENTS

| | | | |
|---|---|---|---|
| 3,052,132 | 9/1962 | Dittrich et al. | 74/230.17 F |
| 3,451,283 | 6/1969 | Rattunde | 74/230.17 A |
| 3,600,960 | 8/1971 | Karig | 74/230.17 F |
| 3,280,649 | 10/1966 | Bruet | 74/230.17 F |
| 3,195,368 | 6/1965 | Boudewezin | 74/230.17 F |
| 3,600,961 | 8/1971 | Rattunde | 74/230.17 F |
| 3,596,528 | 8/1971 | Dittrich | 74/230.17 F |

Primary Examiner—Charles J. Myhre
Assistant Examiner—R. H. Lazarus
Attorney—Jennings Bailey, Jr.

[57] ABSTRACT

In an infinitely variable cone pulley transmission with one cone fixed on a shaft and the other slidable thereon but rotatable therewith, a pressure chamber is formed connected with the movable disc. This is separated into two spaces by a partition secured on the shaft. Pressure fluid is supplied to the space nearest the pulley disc, and is allowed to pass through a throttled passage into the space remote from the pulley disc and to escape therefrom through a narrow annular slot in the portion of the space closest to the shaft axis.

The axial pressure caused by centrifugal force in the first space is at least substantially counter-balanced by the axial force produced by the centrifugal force in the second space. Further, the continuous flow of pressure fluid prevents the build-up of localized heating in the pressure chamber.

7 Claims, 6 Drawing Figures

PATENTED JAN 1 1974

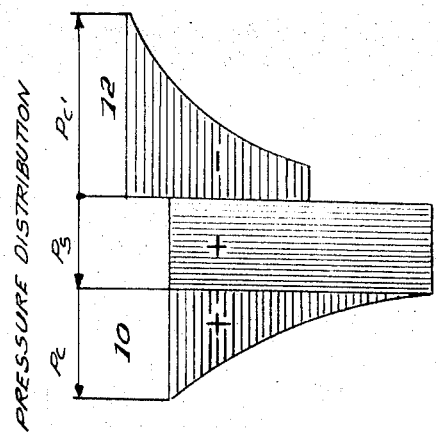
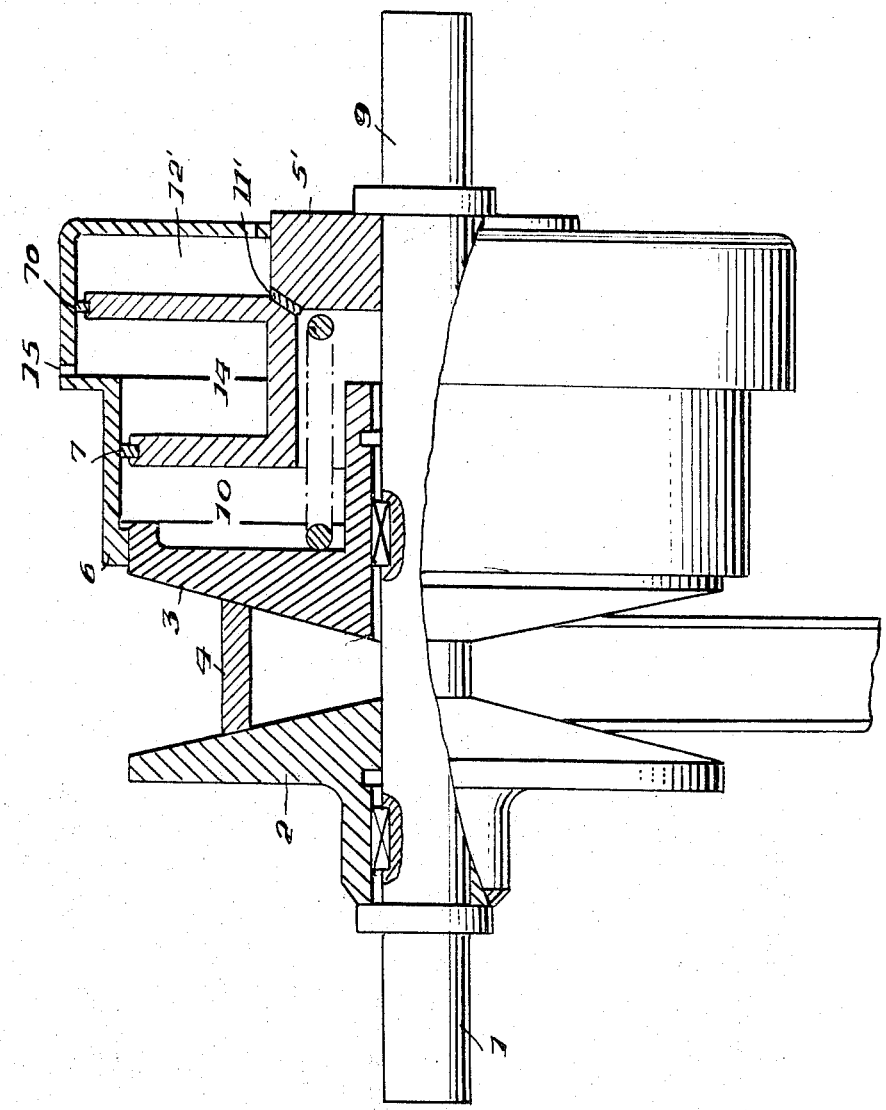

INFINITELY VARIABLE CONE PULLEY TRANSMISSION

BACKGROUND OF THE INVENTION

1. Field of the Invention

The invention relates to the control of a cone pulley transmission composed of relatively movable discs.

2. The Prior Art

In known sets of such discs, the hydraulic positioning pressure operates in the way that the pressure medium exerts a positioning force on the axially movable cone disc. The necessary pressure force can be produced hydraulically, through helically shaped curved paths, which transform circumferential into axial pressure, or through pressure springs. Combinations of these types of pressure are also possible.

Infinitely variable drives are being installed in increasing numbers in automatic control systems. In consequence of the rotational speed in the new operating conditions, the device should operate with the least possible lag, and the frequency characteristic must therefore meet the predetermined requirements.

In the known construction of sets of discs, the cylindrical diameter however is usually smaller than the outside diameter of the discs. These thus produce quite small positioning forces, so that the mechanism reacts to control commands relatively sluggishly. If the diameter of the cylinder is increased, there are two disadvantages as follows:

1. The fluid filled rotating cylinder produces through centrifugal force an axial pressure, which increases as the square of the speed of rotation, but as the fourth power of the radius. The pressure force resulting from this factor alone makes up indeed a substantial part of the whole pressure force and disturbs the necessary pressure values very severly, especially in the high gear condition for maximum driving speed.

2. The removal of heat from the movable conical disc is poor, if the cylindrical diameter is increased. If the infinitely variable drive transmits with constant ratio a predetermined load the oil remains in the pressure space. It is then not interchanged and a heat localization results. The oil in the pressure chamber is then warmer than the oil in the oil sump. On the contrary the corresponding heat on the stationary conical disc is conducted off on all sides by an oil spray. The different temperatures of the fixed and movable conical discs subject them to a disadvantageous influence on the symmetricality of the frictional characteristics and to wear.

SUMMARY OF THE INVENTION

The purpose of the invention is to provide an arrangement in which in disc sets of the previously described type the centrifugal force influence and the heat localization will be avoided. The purpose of the invention is achieved in that the outwardly limiting wall part which encloses two cylindrical spaces is connected with the axially movable disc, and the positioning piston with the stationary disc, so that the pressure medium in two cylindrical spaces, which is subjected to a pressure produced through the centrifugal force, can flow outward to a limited extent.

According to the invention, in one or more sets of discs of an infinitely variable cone pulley and belt transmission, in which the pressure forces on the driving and driven sides are furnished completely or partly by pressure fluid, the surfaces of the axially movable discs which are subjected to pressure medium operate as rotating positioning pistons and the individual pressure space for the positioning piston is separated by a separating wall, which is keyed or pressure fitted on the shaft, and which forms a carrier for a seal, from a second fluid-filled cylindrical space, wherein a limited flow of fluid between the two cylinder spaces is possible.

Piston sets for cone pulley transmissions are already known, in which also the wall part separating the second cylindrical space from the outside is connected with the axially movable disc and the positioning piston with the stationary cylindrical disc. However, in this case the second cylindrical space is provided with its own supply line and seal through which a controlled over- or under-pressure can be supplied.

The use of an hydraulic differential pressure arrangement for the cone pulley positioning does indeed avoid the disturbing centrifugal force effect, but not the heat localization. Furthermore the cone pulley, resulting from the effect of the drive output speed on the positioning commands, takes place sluggishly, because, through the additional resistance in the inlet pipe to the second cylindrical space, the in-and out-flow of the pressure medium is slowed down. A decrease of this resistance to inward and outward flow is for constructive reasons only possible to a limited degree, because for a differential pressure control two inlets through the rotating shaft are required. The expense of the construction is quite considerable.

According to the invention, not only is the disturbing influence of the centrifugal force compensated, but also the localization of heat which is disadvantageous for the equalization of friction, without additional pipes or seals for the second cylindrical space. The value of the invention lies therein that with a simple construction a relatively large operation is permitted.

The centrifugal force components in the two cylindrical spaces work against one another, in that the common separating wall is connected fast with the shaft and further because the centrifugal oil pressure acts at the same time upon the inner face of the movable pulley disc and on the other hand the inner face of the wall of the second cylindrical space which is rigidly connected with the movable conical disc. Moreover oil flows continuously out of the pressure space in the second cylindrical chamber and is held therein through rotation of the set of discs. Generally the leakage oil which passes through a packing is enough. The excess oil escapes continuously through openings in the neighborhood of the inside diameter of the second cylindrical space which advantageously is constructed as an annular gap. The outlet cross-section must be accurately measured, in such a way that during quick adjustments of position no additional resistance results. In this way there results a continuous circulation of oil, which prevents the localization of heat in the movable piston disc.

According to one embodiment the influence of the cylindrical force is wholly or partly compensated, no matter how great the cylindrical diameter of the two cylindrical spaces may be. Because the axial force created by the centrifugal force varies as the fourth power of the radius, the compensation in a small diameter structure is practically insignificant, but very effective in structures of large diameter.

The characteristics of the arrangement according to the invention are especially important in drives in which the dynamic requirements, for example as components in control circuits, are important, and they are not only important but almost necessary for the provision of modern high-load drives. The expense of the construction for achieving these advantageous characteristics is relatively small.

BRIEF DESCRIPTION OF THE DRAWINGS

In the drawings:

FIG. 3 shows another modification and FIG. 3a is a diagram showing the operation of FIG. 3.

DESCRIPTION OF THE PREFERRED EMBODIMENTS

Figure 1A:
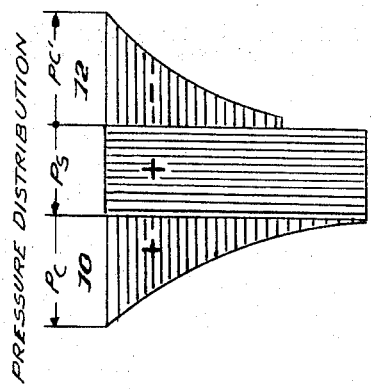
FIG. 1a is a diagram explaining the results of FIG. 1.

In the following description, the same reference characters are used to indicate the same parts.

Figure 1:
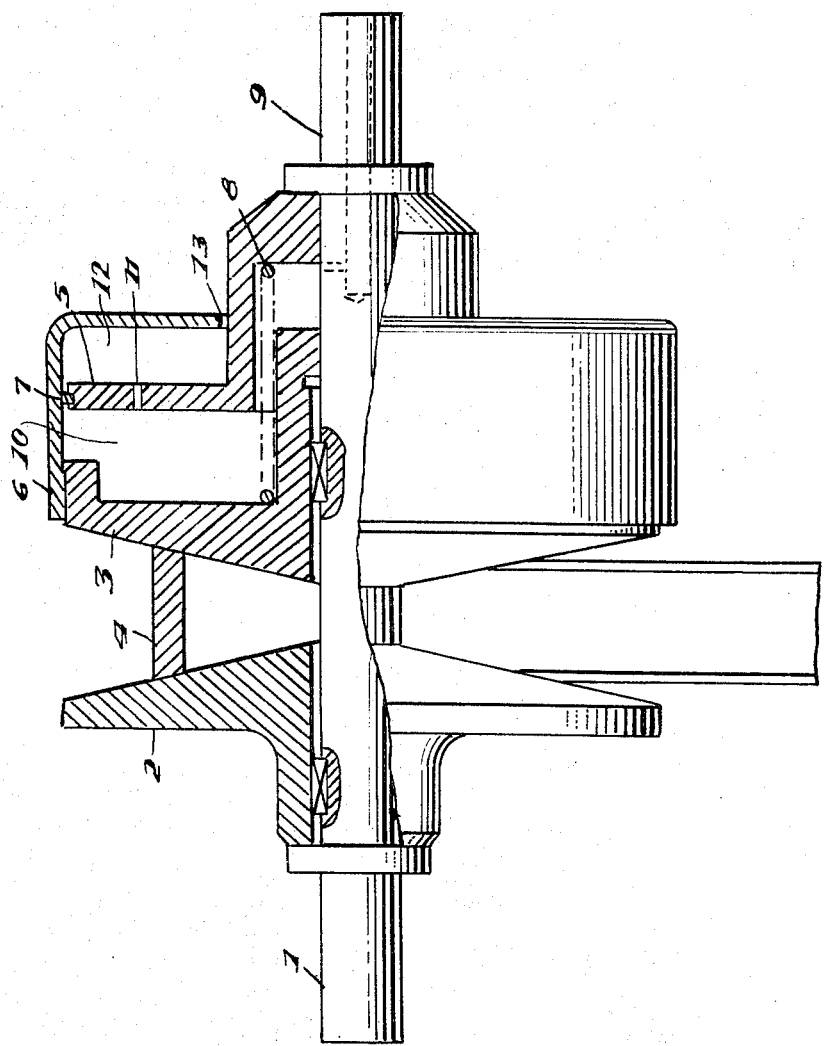
FIG. 1 shows in cross-section one form of cone pulley set according to the invention.

Referring to FIG. 1, a stationary conical disc 2 is connected rigidly with the shaft 1. The movable conical disc 3 is axially slidable on the shaft 1, but is connected with it for rotation. Between the pulley discs 2 and 3 is the belt 4. The seal carrier 5 is connected with the shaft 1, and the cylinder 6 with the movable conical pulley 3. The seal carrier 5 carries the seal 7. The spring 8 provides a predetermined tension of the belt 4. In the operation of such an arrangement, consisting of at least two sets of discs, pressure oil flows through the shaft bore 9 into the pressure space 10, so that the movable pulley disc 3 is forced against the belt 4. Through a small throttle opening 11 as well as through leakage of oil past the packing 7, the second cylindrical space 12 is filled with oil. The oil is held in the second cylindrical space by rotation. Excess oil escapes through a ring gap 13.

FIG. 1a shows schematically the distribution of pressure when the pulley set is in operation. It will be noted that the centrifugal pressure Pc in the space 10 is substantially counter-balanced by the pressure Pc' in the space 12, particularly at higher speeds. Ps is the static pressure provided through passage 9.

Figures 2, 2A:
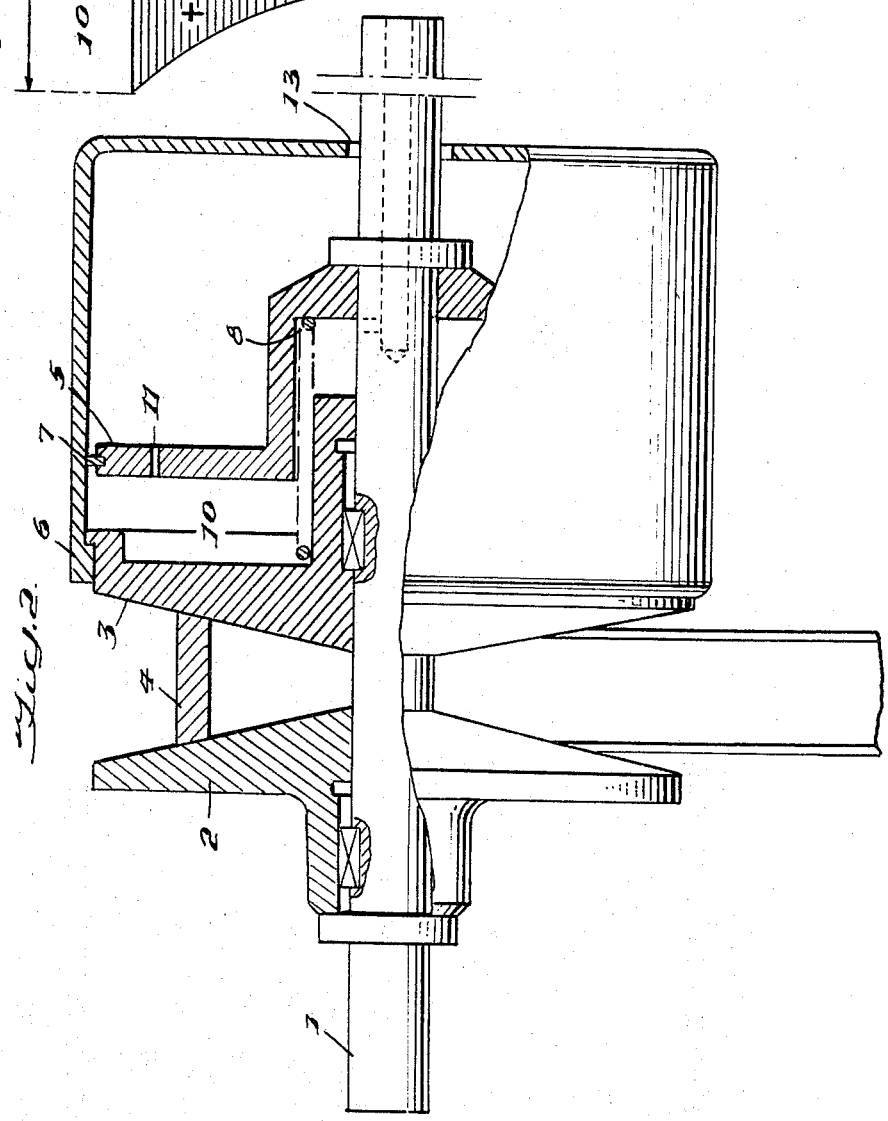
FIG. 2 shows a second modification.
FIG. 2a is a diagram explanatory of an operation of FIG. 2.

In the arrangement of FIG. 1, it will be noted that the effective cross-section of the space 10 is somewhat greater than that of the space 12. Referring to FIG. 2, there is shown an arrangement in which the effective cross-sections of the two spaces are substantially equal.

As is shown by FIG. 2a, the axial forces resulting from the centrifugal force are substantially equalized in this arrangement through the whole range of speeds.

Referring now to FIG. 3, the member 5' has two upward extensions carrying seals 7 and 7a respectively, leaving a space 14 between them. This space has a leak hole 15 for any oil which may pass the seals 7 and 7a. Oil passes from the chamber 10' to the chamber 12' through a throttle passage 11'.

In this arrangement, as shown in FIG. 3a, the backward pressure in the chamber 12 resulting from centrifugal force exceeds that in chamber 10 at high speeds.

I claim:

1. In an infinitely variable conical pulley and belt transmission, having a shaft, a first cone pulley part fixed on the shaft, a second facing cone pulley part slidable on the shaft and rotatable therewith, means rigid with said second part forming a pressure cylinder, a separating wall secured on said shaft located within said pressure cylinder and dividing the same into a first chamber on the side nearest the second part and a second chamber remote from the second part, means to supply pressure fluid to said first chamber, first means to permit limited flow of pressure fluid from the first chamber into the second chamber, and second means to permit limited flow of pressure fluid from the second chamber to the outside, whereby the axial forces produced in the first chamber by centrifugal force are at least to a substantial extent counter-balanced by axial forces produced in the second chamber by centrifugal force.

2. In a transmission as claimed in claim 1, said first means including a throttled passage in said separating wall.

3. In a transmission as claimed in claim 1, said separating wall having a sealing means on its periphery engaging the inside of the pressure cylinder wall, said first means comprising said sealing means past which fluid can leak into the second chamber.

4. A transmission as claimed in claim 1, in which the effective cross-sectional areas of the chambers are equal.

5. A transmission as claimed in claim 1, in which the second means is located adjacent the portion of the second space nearest the shaft.

6. A transmission as claimed in claim 5, in which the second means is an annular gap at the inner edge of the cylinder forming means.

7. A transmission as claimed in claim 1, in which the second means is an annular gap at the inner edge of the cylinder forming means.

* * * * *